United States Patent
Wittgrebe

(10) Patent No.: US 8,162,560 B2
(45) Date of Patent: Apr. 24, 2012

(54) QUICK-FIXING ELEMENT

(75) Inventor: Achim Wittgrebe, Bielefeld (DE)

(73) Assignee: Paul Hettich GmbH & Co. KG., Kirchlengern (DE)

( * ) Notice: Subject to any disclaimer, the term of this patent is extended or adjusted under 35 U.S.C. 154(b) by 0 days.

(21) Appl. No.: 12/096,330

(22) PCT Filed: Dec. 19, 2006

(86) PCT No.: PCT/EP2006/069939
§ 371 (c)(1),
(2), (4) Date: Sep. 23, 2008

(87) PCT Pub. No.: WO2007/074114
PCT Pub. Date: Jul. 5, 2007

(65) Prior Publication Data
US 2009/0016812 A1      Jan. 15, 2009

(30) Foreign Application Priority Data

Dec. 29, 2005   (DE) ............... 20 2005 020 458 U

(51) Int. Cl.
*F16B 21/08*      (2006.01)
(52) U.S. Cl. ..... 403/397; 403/326; 24/563; 248/220.21; 126/339
(58) Field of Classification Search .............. 403/326, 403/329, 397, 400, DIG. 1; 248/220.21, 248/220.22, 222.13, 225.21, 250; 411/520, 411/539, 541; 24/336, 339, 545, 546, 551, 24/552, 563, 910; 126/333, 339; 267/158–160; 211/4, 182; 312/330.1, 334.4, 334.5, 334.1, 312/334.7, 350, 410
See application file for complete search history.

(56) References Cited

U.S. PATENT DOCUMENTS

| 2,154,046 | A | * | 4/1939 | Kost ............................ 248/73 |
| 3,563,200 | A | * | 2/1971 | Grossman ................... 116/28 R |
| 3,806,994 | A | * | 4/1974 | Lankford ..................... 403/397 |
| 4,900,184 | A | * | 2/1990 | Cleveland ..................... 24/339 |
| 5,639,049 | A | * | 6/1997 | Jennings et al. ........... 248/74.2 |
| 6,155,739 | A | * | 12/2000 | Sekine et al. ................... 403/12 |
| 6,327,758 | B1 | * | 12/2001 | Petrakis et al. ................ 24/546 |
| 6,643,900 | B2 | * | 11/2003 | Jahrling ......................... 24/563 |
| 6,830,280 | B2 | * | 12/2004 | Sturt et al. ................... 296/97.9 |
| 6,938,617 | B2 | * | 9/2005 | Le et al. ....................... 126/339 |
| 7,316,203 | B2 | * | 1/2008 | Marchioro ................... 119/474 |
| 7,452,157 | B2 | * | 11/2008 | Deciry ......................... 403/396 |

FOREIGN PATENT DOCUMENTS

| DE | 200 10 037 U1 | 8/2000 |
| DE | 20 2004 005475 U1 | 7/2004 |

* cited by examiner

*Primary Examiner* — Michael P Ferguson
*Assistant Examiner* — Nahid Amiri
(74) *Attorney, Agent, or Firm* — Barnes & Thornburg LLP

(57) ABSTRACT

A quick-fixing element mounted on a guide rail and configured to receive at least one horizontally running rod of a grid side part. The rod includes an angled end region. The quick-fixing element includes a first clip retaining section constructed to partially engage around the rod at a predetermined position along a length of the rod. The quick-fixing element also includes a second clip retaining section configured to partially engage around the rod at the angled end region.

11 Claims, 4 Drawing Sheets

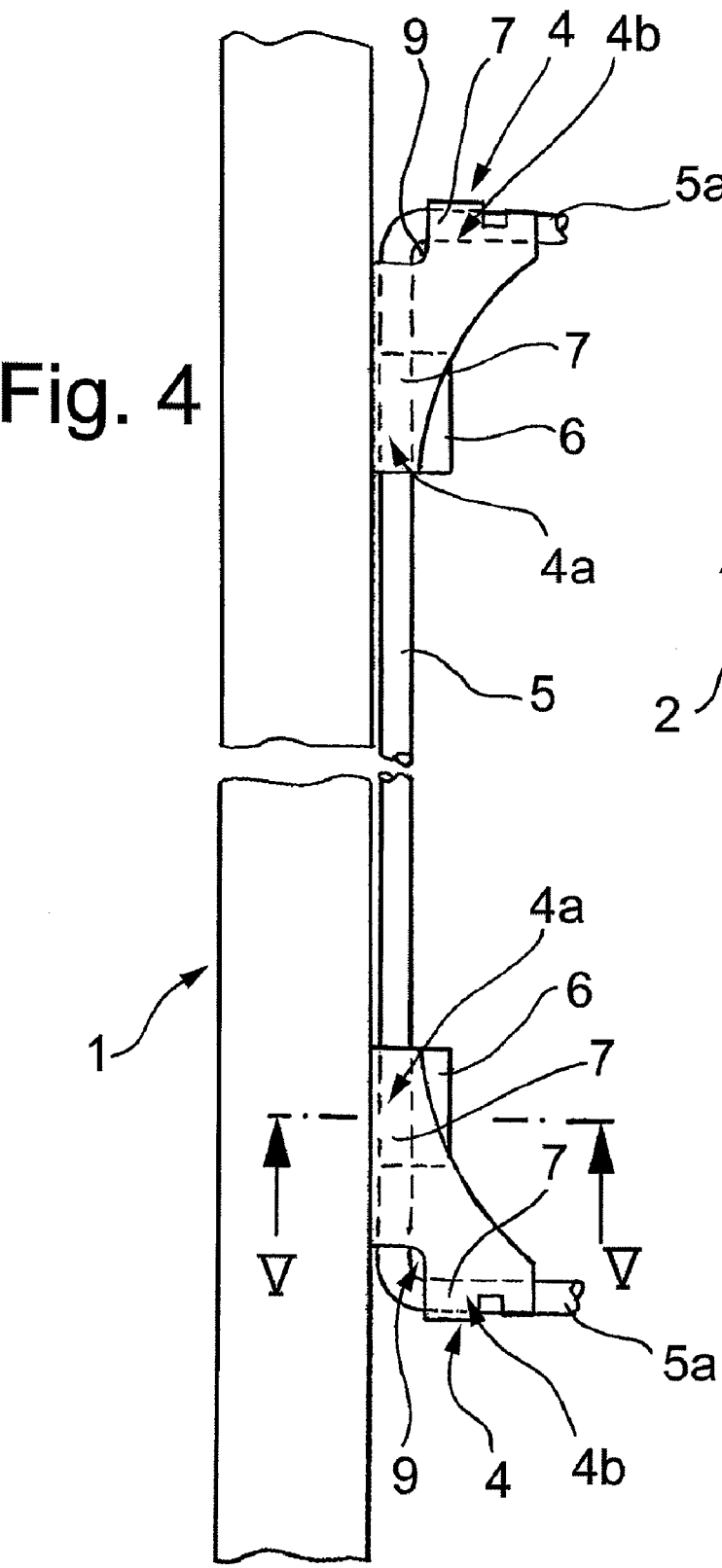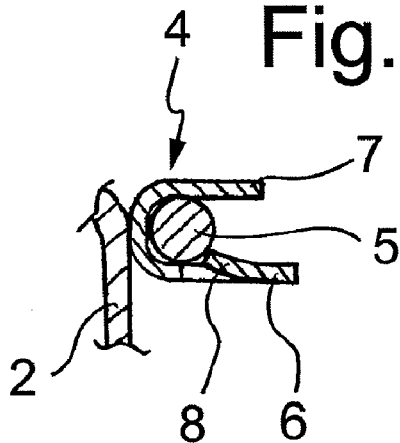

QUICK-FIXING ELEMENT

CROSS-REFERENCE TO RELATED APPLICATION(S)

This application is a National Phase Entry based upon and relying for priority on International Patent Application No. PCT/EP2006/069939, filed on Dec. 19, 2006. This application also relies for priority on German Patent Application Serial No. DE 20 2005 020 458.7, which was filed on Dec. 29, 2005. The contents of both of these patent applications are incorporated herein by reference.

FIELD OF THE INVENTION

The present invention relates to quick-fixing elements that may be employed in, for example, appliances such as dishwashers, baking ovens, or the like. More specifically, the present invention relates to a quick-fixing element for fixing guide rails to horizontally running rods of a grid-type side part, which rods are bent away at an angle from a guide rail in an end region of the guide rail.

DISCUSSION OF RELATED ART

Quick-fixing elements of the type in question are known per se, for example from DE 200 10 037 U1.

While such quick-fixing elements are primarily used for securing guide rails in domestic appliances, such as dishwashers, baking ovens or the like, they may also be used in other furniture items as well.

In the case of the grid-like side parts, which are formed from wire or rods, a plurality of horizontal rods running parallel to one another is provided. The rods are angled in their end regions in such a manner that the angled sections protrude in the direction of a side wall of a domestic appliance or of an item of furniture from a fixed guide rail.

SUMMARY OF THE INVENTION

The present invention is based on the object of providing a quick-fixing element of the type in question which permits satisfactory securing of a guide rail to just one horizontally running rod of a grid-type side part.

This object is achieved according to the invention in that the quick-fixing element has a first clip-type retaining section, which partially engages around the longitudinal length of a rod. The quick-fixing element also includes a second clip-type retaining section, which partially engages around the rod at an angled end region of the rod. The quick-fixing element may be pushed in the horizontal direction onto the end region of the rod.

This design enables a guide rail to be secured—with respect to the longitudinal axis of a horizontally running rod—in a manner that resists twisting or tilting, since the quick-fixing element forms a means of resisting tilting by its second clip-type retaining section, among other features. The second clip-type retaining section partially engages around the rod at its angled end region. Since corresponding quick-fixing elements are used to secure a guide rail to a rod in both end regions of the guide rail and therefore also to the rod, both end regions of the angled rod are engaged because they are surrounded by the quick-fixing elements. Therefore, not only is a securement against twisting or tilting obtained, but a longitudinal displacement of the guide rail part secured to the rod also is prevented. In other words, because they each engage the rod both along its length and also at a point adjacent to the angled end section, the quick-fixing elements discourage rotation of the guide rail with respect to the rod. In addition, the quick-fixing elements discourage sliding of the guide rail along the length of the rod.

An unintentional release of the quick-fixing element from a rod may be avoided in one embodiment because the quick-fixing element is clamped strongly on to the rod by frictionally engaging the rod.

In another embodiment, to avoid an unintentional release of the quick-fixing element from the rod, a limb of the retaining section may be equipped with a resilient latching tongue. The resilient latching tongue engages around the rod in its longitudinal extent region the quick-fixing element is pushed on the rod, the resilient latching tongue bears against a region of the rod that faces away from the guide rail.

In the case of this solution, a certain form-fitting connection against unintentional release of the quick-fixing element from a rod is achieved. However, since the latching tongue is resilient, with the use of a certain amount of effort, an intentional release of the quick-fixing element and therefore of the guide rail from the rod may be brought about, as may be required, for example, for the purpose of cleaning both the guide rail and the grid-type side part.

Further features of the invention will be described in greater detail below.

BRIEF DESCRIPTION OF THE DRAWINGS

An exemplary embodiment of the invention is illustrated in the attached drawings and is described in more detail below.

In the drawings:

FIG. 4 shows a schematically illustrated top view of a guide rail with quick-fixing elements and a horizontally running rod, to which the quick-fixing elements and, therefore, the guide rail are releasably fastened, and FIG. 5 shows a cross-section of the guide rail and one of the quick-fixing elements, taken along the line VV in FIG. 4.

DESCRIPTION OF EMBODIMENT(S) OF THE INVENTION

While the invention is described in connection with specific embodiment(s), the invention is no intended to be limited solely to the embodiments described and illustrated. To the contrary, the invention is intended to encompass any variations and equivalents apparent to those skilled in the art.

Figure 1:
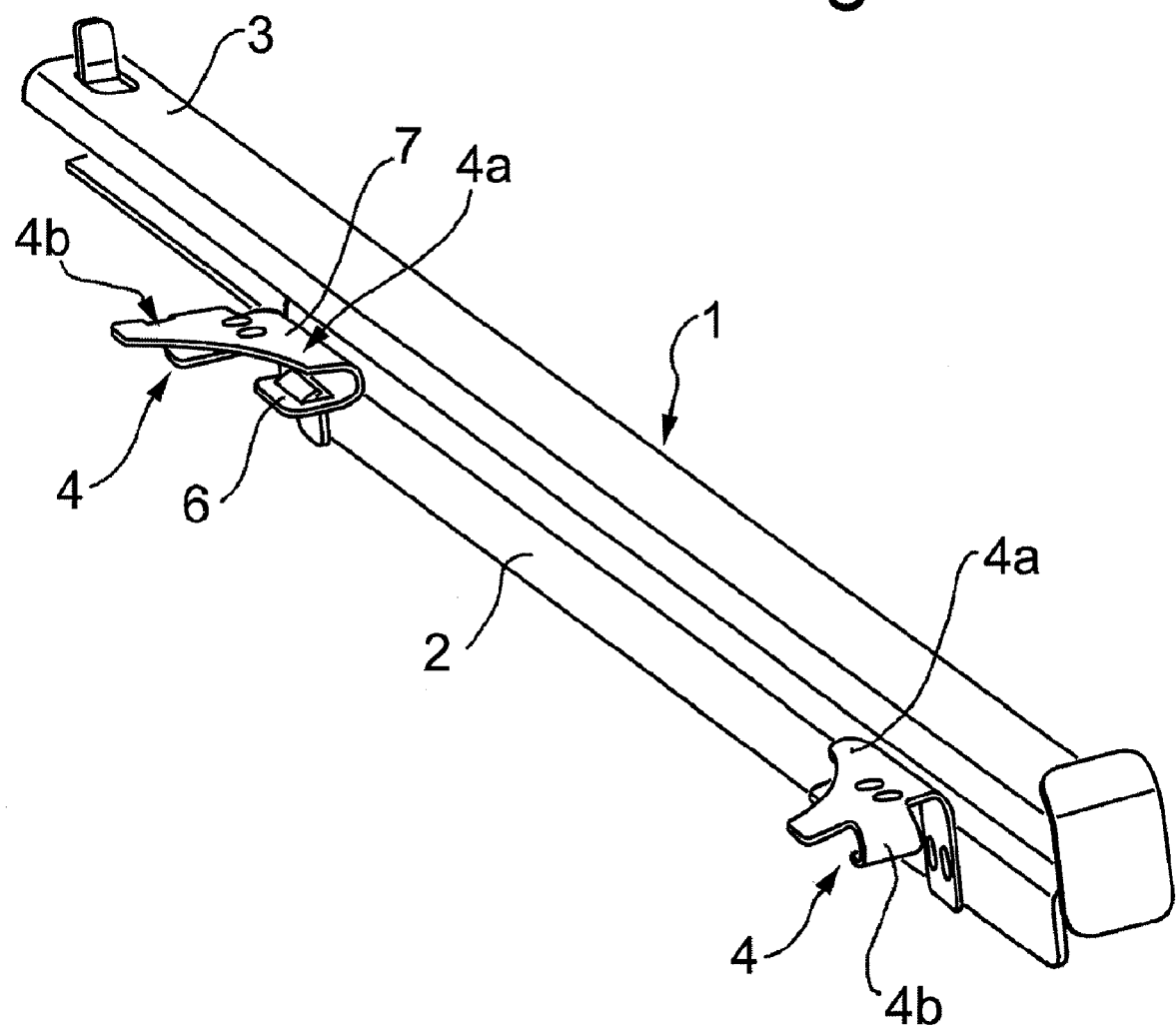
FIGS. 1-3 show, from various viewing directions, perspective illustrations of a guide rail with quick-fixing elements according to the present invention fastened thereto.
Figure 2:
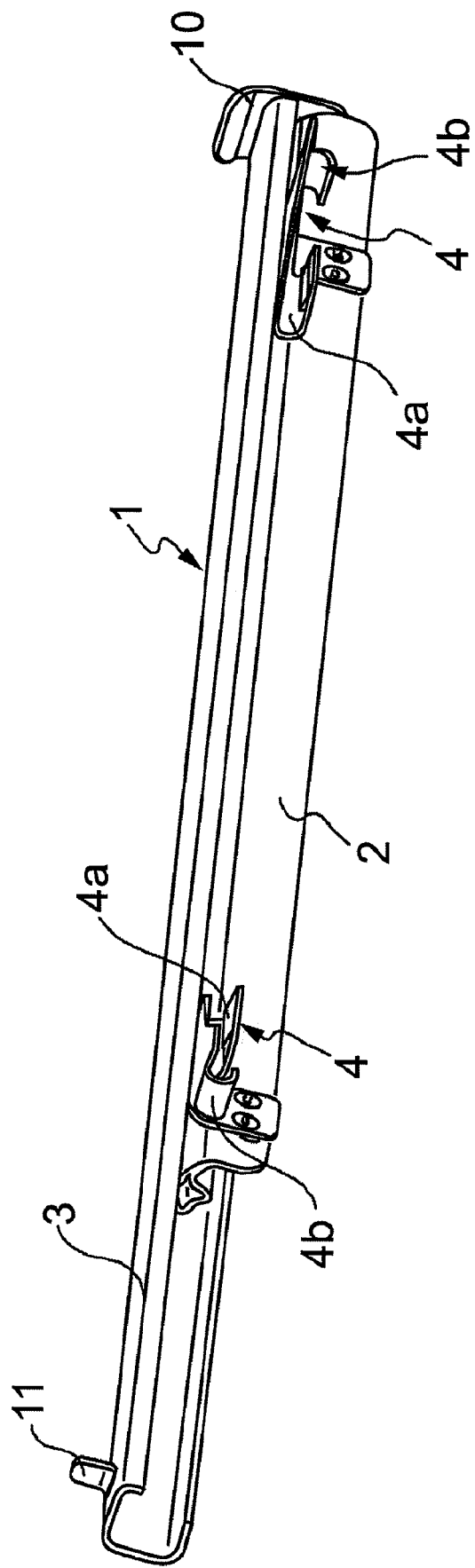
Figure 3:
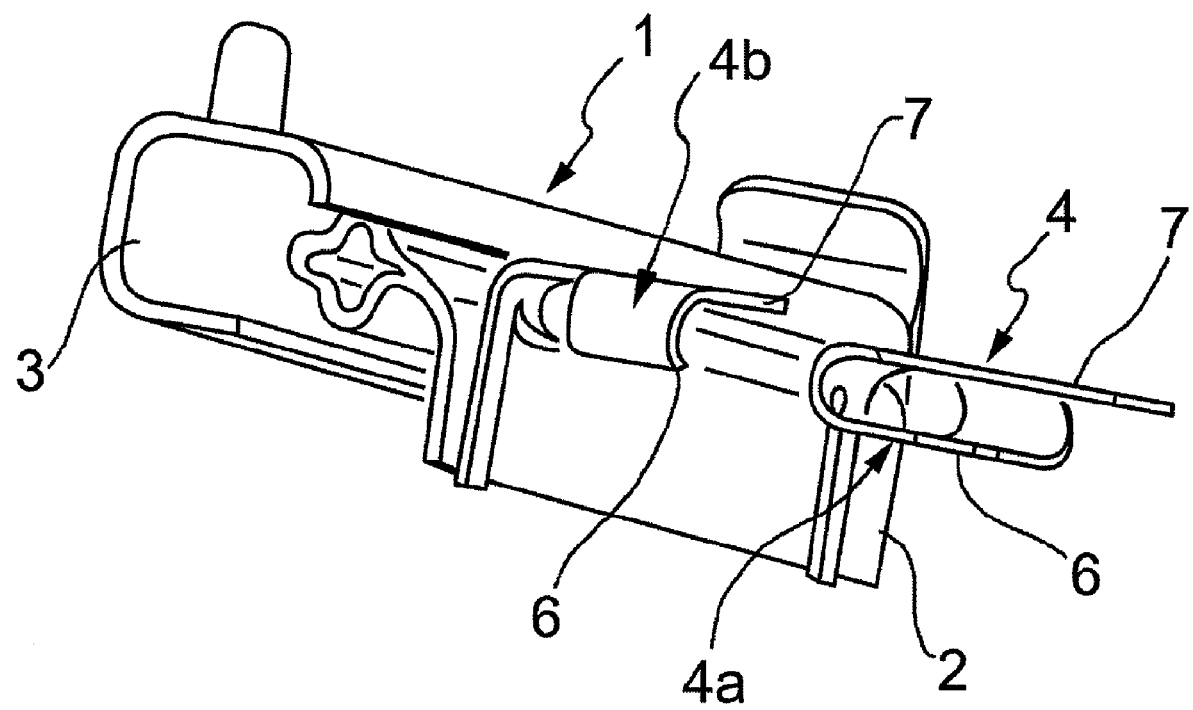

FIGS. 1-3 each denote, by the reference number 1, a guide rail which has a body rail 2, which can be secured in a baking oven or the like, and a running rail 3 which is displaceable longitudinally with respect thereto.

Quick-fixing elements 4 are fixed to the body rail 2 in the end regions thereof.

FIG. 4 shows the quick-fixing elements 4 from a top view and in the fitted state. FIG. 4 shows clearly that the quick-fixing elements 4 are secured to a horizontally running rod 5 of a grid-type side part (not illustrated specifically).

The rod 5 is bent away at an angle in its end regions in relation to the guide rail 1, with the bent-away end regions 5a extending approximately at right angles to the guide rail 1 in the exemplary embodiment illustrated. Of course, angular ranges other than 90° may be employed without departing from the scope of the invention.

The quick-fixing elements 4 each have a first clip-type retaining section 4a, which partially engages around the rod 5 in its longitudinal extent region. The quick-fixing elements also have a second clip-type retaining section 4b, which partially engages around the rod 5 in its angled end region 5a. In this contemplated embodiment, the clip-type retaining sections 4a and 4b are designed in such a manner that each quick-fixing element 4 may be pushed in the horizontal direction onto the end region of a rod 5.

The respective retaining sections 4a and 4b are approximately C-shaped in cross section, as FIG. 5, for example, shows clearly. Each of the retaining sections 4a and 4b have a lower and an upper limb 6 and 7. In this embodiment, the respective upper limb 7 rests on the rod 5 and the lower limb 6 bears against the lower side of the rod 5. In this embodiment, the distance between the two limbs 6 and 7 may be selected such that, when the quick-fixing elements 4 are pushed onto the rod 5 or the angled regions 5a thereof, the quick-fixing elements 4 clamp onto the rod 5 and/or the angled regions 5a.

In the embodiments contemplated, the quick-fixing elements 4 are fastened to the body rail 2 by welding or the like. The guide rail 1 is secured in relation to the rod 5 to avoid tilting or twisting of the guide rail 1 with respect to the rod 5. This securement is facilitated by the engagement of the second clip-type retaining region 4b of each quick-fixing element around the angled end region 5a of the rod 5.

In addition, this type of fixing prevents a relative longitudinal displacement of the body rail 2 in relation to the rod 5.

FIG. 5 shows that the lower limb 6 of the clip-type retaining part 4a, which engages around the longitudinal extent region of the rod 5, is equipped with a resilient latching tongue 8 pointing in the direction of the rod 5. In the fitted state, as shown in FIG. 5, the resilient latching tongue 8 bears against one of the body rails 2 and therefore also against the region of the rod 5 that faces away from the guide rail 1. Therefore, an inadvertent release of the quick-fixing element 4 from the rod 5 is prevented here because of the nearly form-fitting connection between the resilient latching tongue 8 and the rod 5, among other features. A separation of the quick-fixing element 4 from the rod 5 therefore may be consciously brought about only by means of a certain effort, in particular an intentional effort by the person effectuating the separation of the guide rail 1 from the rod 5.

The quick-fixing elements 4 are each provided with a clearance cut 9 in the transition region between the longitudinal extent region of the rod 5 and the angled end regions 5a of said rod 5.

By means of the quick-fixing elements 4 according to the invention, there is the possibility of securing guide rails 1 to just one rod 5 of a grid-type side part in a manner that is secure against twisting and tilting.

As FIGS. 1 to 3 show, the guide rail 1 has overall a relatively simple construction. The running rail 3 is mounted on rolling bodies via three running tracks. Therefore, the running rail 3 slides in relation to the body rail 2 via the running tracks.

A welded end stop 10 is provided instead of as previously customary. The welded end stop 10 is a cast stopper at one end of the running rail 3. A deployed folding tab 11 is provided at the other end of the running rail 3 to secure a baking tray, a grate, a juice pan or the like on the running rail 3 in the direction of displacement. Such a guide rail may be produced particularly cost-effectively without ultimately incurring functional disadvantages. Of course, other guide rails 1 also may be used in conjunction with quick-fixing elements 4 according to the invention.

The quick-fixing elements 4 are preferably produced from metal. In this case, a single-piece manufacturing is preferred. The design of the quick-fixing elements 4 makes it possible to produce the quick-fixing elements 4 at particularly reasonable cost as punched and bent parts.

The latching tongue 8 is advantageously formed by means of a section punched out of the material of the lower limb 6.

What is claimed:

1. A quick-fixing element mounted on a guide rail, the guide rail including a body rail and a running rail displaceable horizontally with respect to the body rail, and the quick-fixing element configured to receive at least one horizontally running rod of a grid side part, the rod having an angled end region, and the quick-fixing element comprising:
   a first clip retaining section defining a first retaining channel configured to partially engage around the rod at a predetermined position along a length of the rod;
   a second clip retaining section defining a second retaining channel angled relative to the first retaining channel which is configured to partially engage around a periphery of the rod at the angled end region;
   wherein at least the second clip retaining section is configured to receive the angled end region of the rod and guide the rod into the first clip retaining section; and
   wherein the quick-fixing element is configured to be pushed in a horizontal direction perpendicular to a longitudinal length of the guide rail onto the angled end region of the rod such that the second clip retaining section substantially surrounds the angled end region of the rod, and the angled end region runs at an angle with respect to the longitudinal length of the guide rail.

2. The quick-fixing element as claimed in claim 1, wherein at least one of the first clip retaining section or the second clip retaining section is of a C-shaped design in cross section, including a lower and an upper limb, with the upper limb being configured to rest on the rod and the lower limb being configured to bear against a lower side of the rod.

3. The quick-fixing element as claimed in claim 2, wherein the lower limb includes a resilient latching tongue configured to bear against a region of the rod facing away from the guide rail.

4. The quick-fixing element as claimed in claim 3, wherein the latching tongue comprises a section punched out of the material forming the lower limb.

5. The quick-fixing element as claimed in claim 1, the quick-fixing element is configured to define a clearance cut in a transition region between the angled end region and the length of the rod.

6. The quick-fixing element as claimed in claim 1, wherein the quick-fixing element is constructed as a single piece.

7. The quick-fixing element as claimed in claim 1, wherein the quick-fixing element is manufactured from metal.

8. The quick-fixing element as claimed in claim 7, wherein the quick-fixing element is a punched and bent part.

9. The quick-fixing element as claimed in claim 1, wherein the quick-fixing element is configured to be pushed in a clamping manner onto the rod.

10. A quick-fixing element mounted on a guide rail, the guide rail including a body rail and a running rail displaceable horizontally with respect to the body rail, and the quick-fixing element configured to receive at least one horizontally running rod of a grid side part, the rod having an angled end region, and the quick-fixing element comprising:
   a first clip retaining section including a first receiving channel extending in a first direction and configured to partially engage around the rod at a predetermined position along a length of the rod;
   a second clip retaining section including a second receiving channel angled relative to the first retaining channel, the second clip retaining section extending in a second direction different from the first direction of the first receiving portion and configured to partially surround and engage the perphery of the rod at the angled end region; and wherein at least the second clip retaining section is configured to receive the angled end region of the rod and guide the rod into the first clip retaining section.

11. The quick-fixing element as claimed in claim 10, wherein the quick-fixing element is configured to be pushed in a clamping manner onto the angled end region of the rod, and the angled end region runs at an angle with respect to a longitudinal length of the rod.

* * * * *